(12) United States Patent
Lachwani

(10) Patent No.: US 8,612,658 B1
(45) Date of Patent: Dec. 17, 2013

(54) INTERRUPT REDUCTION

(75) Inventor: Manish Lachwani, Sunnyvale, CA (US)

(73) Assignee: Amazon Technologies, Inc., Reno, NV (US)

(*) Notice: Subject to any disclaimer, the term of this patent is extended or adjusted under 35 U.S.C. 154(b) by 424 days.

(21) Appl. No.: 12/862,526

(22) Filed: Aug. 24, 2010

(51) Int. Cl.
*G06F 13/24* (2006.01)

(52) U.S. Cl.
CPC .................................. *G06F 13/24* (2013.01)
USPC ........................................ 710/262; 710/268

(58) Field of Classification Search
USPC ........................................................ 710/262
See application file for complete search history.

(56) References Cited

U.S. PATENT DOCUMENTS

| | | | | |
|---|---|---|---|---|
| 4,250,546 A | * | 2/1981 | Boney et al. | 710/262 |
| 5,253,356 A | * | 10/1993 | Yamadate et al. | 710/22 |
| 6,078,970 A | * | 6/2000 | Nordstrom et al. | 710/19 |
| 6,665,750 B1 | * | 12/2003 | Williams et al. | 710/48 |
| 7,375,535 B1 | * | 5/2008 | Kutz et al. | 324/658 |
| 7,415,559 B1 | * | 8/2008 | Butterworth et al. | 710/261 |
| 2009/0115740 A1 | * | 5/2009 | Ningrat et al. | 345/173 |

OTHER PUBLICATIONS

Tanenbaum, Andrew S.; "Structured Computer Organization"; Prentice-Hall, Inc.; 1990; Third Edition; pp. 11-13.*
Love, Robert; "Kernel Korner—The new Work Queue Interface in the 2.6 Kernel"; Linux Journal; Nov. 1, 2003; available online at wwww.linuxjournal.com; all pages.*
Carnoy, David; Barnes & Noble's 'colo' e-book reader photos leaked; Cnet.com; Oct. 14, 2009; available online at www.cnet.com; all pages.*

* cited by examiner

*Primary Examiner* — Ryan Stiglic
(74) *Attorney, Agent, or Firm* — Lee & Hayes, PLLC

(57) ABSTRACT

An interrupt reducing device driver module reduces the rate at which interrupts from a peripheral burden a processor. The interrupt reducing device driver determines when data is associated with the interrupt. When data is present, such as when indicated by an interrupt status register, further interrupts are masked and a buffer associated with the peripheral is read-out. This read-out continues while data is present in the buffer. Once no further data is present, the data interrupts are unmasked. Reduction in the rate of interrupts prevents resource starvation and improves overall system response. Additionally, the processor and associated components are able to enter and remain in low power modes, improving battery life.

21 Claims, 5 Drawing Sheets ary identifies the figure in which the reference
INTERRUPT REDUCTION

BACKGROUND

Electronic devices controlled by processors may utilize interrupts to handle events, such as activities of peripherals. An interrupt typically causes the processor to save a current state of execution within the processor and begin execution of an interrupt handler to process the interrupt.

A peripheral attached to the processor may generate one or more of these interrupts to call for the attention of the processor. Interrupts allow the processor to respond to input, such as a user touch on a touch sensor. However, the number of interrupts generated may overwhelm the processor and reduce overall response time. In an attempt to alleviate the situation, ring buffers, larger FIFO buffer memory, and so forth may be used. However, this increases the size of a chip housing the buffer, which increases bulk and cost. Furthermore, such measures fail when data rates increase. Traditionally it has not been possible to reduce the number of interrupts without adversely affecting overall operation of the device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
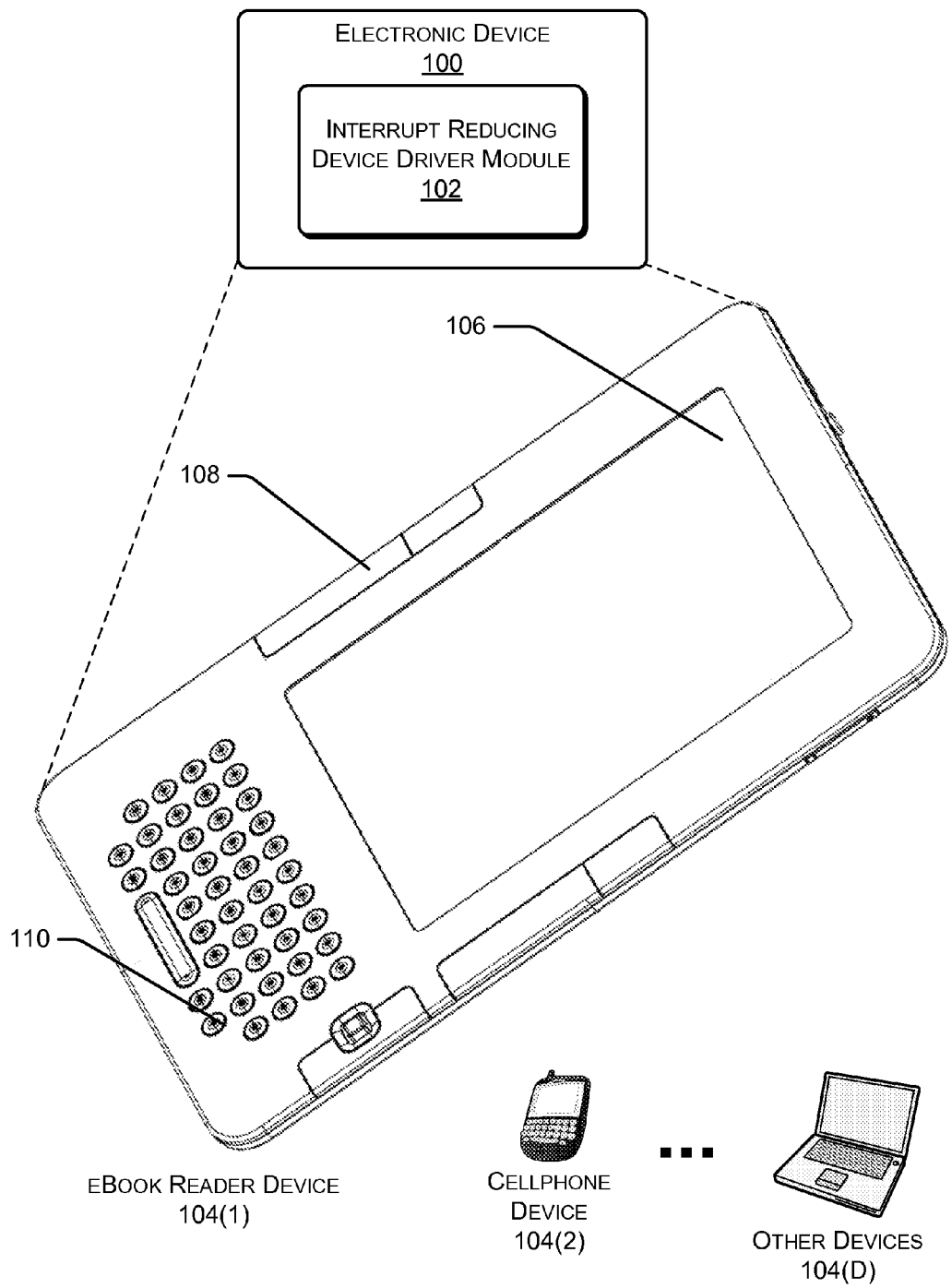
FIG. 1 depicts an electronic device (here, an electronic book reader device) having a display, a touch sensor, and an interrupt reducing device driver module.

Electronic devices with processors, such as cellular phones, portable media players, tablet computers, netbooks, laptops, personal computers, cash registers, electronic book ("eBook") readers, servers, medical devices, data acquisition devices, and so forth, may utilize interrupts for operation. An interrupt typically causes the processor to interrupt a current processing task, save a current state of execution, and begin execution of an interrupt handler. The interrupt handler takes a pre-determined set of actions associated with the interrupt. For example, an interrupt may result from a user touching a touch sensor and generating data. This data may comprise position of a touch upon the touch sensor, magnitude of the touch, and so forth. The touch sensor generates an interrupt announcing to the processor that data is available and requires immediate action. The interrupt results in the suspension of a current task executing on the processor (thus "interrupting" the task) and execution of the interrupt handler.

When an interrupt occurs, the processor saves the state of the running process or kernel thread and services the interrupt. Interrupts typically have a high priority which calls for immediate servicing by the processor.

Peripherals generate interrupts in many situations. For example, a touch sensor may send an interrupt when a buffer fills with touch data from the touch sensor. Some peripherals, such as touch sensors capable of accepting multiple touches, may send interrupts at a rate of 100 per second or more. As a result, the processor may receive an interrupt every 10 milliseconds (ms). The rate at which a touch sensor sends interrupt may be proportional to the frame rate of the sensor. For example, higher frame rates on the touch sensor may generate more frequent interrupts. Even if these interrupts occur in bursts, the processor remains busy. This in turn starves other applications of resources such as processor time because the processor is handling the interrupts rather than performing other work. This degrades overall system performance, while also preventing the processor and associated components such as clocks from entering lower power modes. Thus, high interrupt rates slow down the performance of the electronic device and increase power consumption.

Described below are techniques for reducing interrupts handled by a processor. For illustrative purposes only, and not by way of limitation, the examples herein involve a touch sensor. The interrupt reduction techniques described herein are applicable to other peripherals, as well as any interrupt-driven system. Such a reduction provides several benefits including improving overall system response, reducing power consumption, and so forth.

A device driver may be enhanced to form an interrupt reducing device driver module. For ease of reference, and not by way of limitation, the interrupt reducing device driver module may also be referred to as the interrupt handler. In other implementations, the interrupt reducing techniques may be implemented in one or more other modules or portions of the operating system or applications. When a peripheral, such as a touch sensor, receives input from the user, data is stored in a First-In-First-Out (FIFO) buffer. In addition, an interrupt is sent to the processor indicating that the data in the buffer needs to be handled. As a result of the interrupt, the processor executes an interrupt handler associated with that peripheral.

The interrupt handler determines whether data is present in the buffer. In one implementation, the determination may be made by examining an interrupt status register. The interrupt status register contains one or more bits that are set according to whether data is present in the buffer or not. When a threshold amount of data, such as no data when the buffer is empty, is present, processing of the interrupt completes, and the interrupt handler associated with the peripheral exits, with the processor resuming the previous operation before the interrupt handler was called.

When data is present in the buffer, the interrupt handler masks or turns off data interrupts from the peripheral. As a result of the masking, the addition of data to the buffer, such as from continuing user inputs, no longer generates interrupts or the processor disregards the interrupts. This results in a significant reduction in the number of interrupts.

The interrupt handler then schedules a delayed task. The delayed task is configured to read data from the buffer and send the data to a userspace application, such as an electronic book reader application. The interrupt driver is placed into a "do while" loop in the delayed task that checks the interrupt status register to see if data is present in the buffer. Thus, while data is present in the buffer, the interrupt handler continues to read from the buffer and send the data to the userspace application. When the buffer is exhausted and no further data is present, the interrupt handler unmasks the data interrupts of the peripheral. Once unmasked, the processor receives or otherwise acts upon data interrupts from the peripheral. In another implementation, a kernel thread may be configured to run at a higher priority than other processes and threads. The kernel thread may then wait for a wakeup. This waiting does not use processor resources as it is waiting on a barrier or semaphore. Once an interrupt occurs, the interrupt handler will unblock the kernel thread which may then service the buffer.

As a result of this technique, the processor is able to avoid processing a large number of interrupts, which simply indicate data is in the buffer. For example, in some instances the number of interrupts received by the processor are reduced by approximately 95%. Fewer interrupts results in less processor time and resources spent on interrupt processing/handling and more time performing useful tasks. Additionally, fewer interrupts allows the processor and other components more time to remain in lower power modes, reducing power consumption. In battery-powered devices, this reduction in power consumption extends operational time.

The delayed tasks may be a workqueue or tasklet in the context of a Linux®-based operating system, or a related construct in other operating systems. The delayed tasks can be preemptable and interruptible. Preemption allows for a task being carried out to be temporarily interrupted and then resumed at a later time. This may also be known as a context switch. Interruptability allows for the task to be interrupted via an interrupt. As a result of being preemptable and interruptible, the interrupt handler does not consume all of the processor time, but rather runs for a specific timeslice or until pre-empted or interrupted.

Illustrative Touch-Screen Device

FIG. 1 depicts an illustrative electronic device 100 having a display, a touch sensor, user controls, and an interrupt reducing device driver module 102. Briefly, the interrupt reducing device driver module 102 reduces the number of interrupts a processor within the device 100 receives from peripheral devices such as a touch sensor. More specifically, the module 102 reducing the number of received interrupts resulting from filling a buffer associated with a peripheral. To do so, the interrupt reducing device driver module 102 determines when data interrupts occur. Data interrupts from the peripheral are masked. While data is in a buffer coupled to the peripheral, a delayed task reads data from the buffer and sends the data along to a userspace application. The masking achieves a significant reduction in processor handling of interrupts, while the delayed task prevents a loss of data. Once the buffer is empty, the delayed task unmasks the data interrupts. This process is discussed in more detail below with regards to FIGS. 3-5.

The electronic devices 100 include cellular phones, portable media players, tablet computers, netbooks, laptops, personal computers, cash registers, electronic book ("eBook") readers, servers, medical devices, data acquisition devices, and so forth. Because of this wide applicability, several devices are shown in this illustration that may utilize the interrupt reducing device driver module 102. For example, an electronic book (eBook) reader device 104(1) is shown embodied as a handheld, dedicated eBook reader device. FIG. 1 also illustrates that a cellphone device 104(2) and other devices 104(D), such as a netbook computer, may include and implement the interrupt reducing device driver module 102. As used herein, letters within parenthesis such as "(D)" indicate an integer greater than zero.

The eBook reader device 104(1) may have a display 106 to present content in a human-readable format to a user. The display 106 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 106 may take the form of electronic books or "eBooks." For example, the display 106 may depict the text of the eBooks and also any illustrations, tables, or graphic elements that might be contained in the eBooks. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The electronic device 100 may include a touch sensor for user input. For example, the display 106 of the eBook reader device 104(1) may include a touch sensor, resulting in a touch screen that allows user input comprising contact or gestures relative to the display.

The eBook reader device 104(1) may also incorporate one or more user actuable controls, such as a buttons 108 and a keyboard 110, for user input. The one or more user actuatable controls may have dedicated or assigned operations. For instance, the user actuatable controls may include page turning buttons, a joystick, navigational keys, a power on/off button, selection keys, and so on.

While one embodiment of an electronic device 100 is shown in relation to the eBook reader device 104(1), it is understood that electronic devices include cellular telephones 104(2), and other devices 104(D) such as portable media players, tablet computers, netbooks, laptops, personal computers, cash registers, servers, medical devices, data acquisition devices, and the like.

Figure 2:
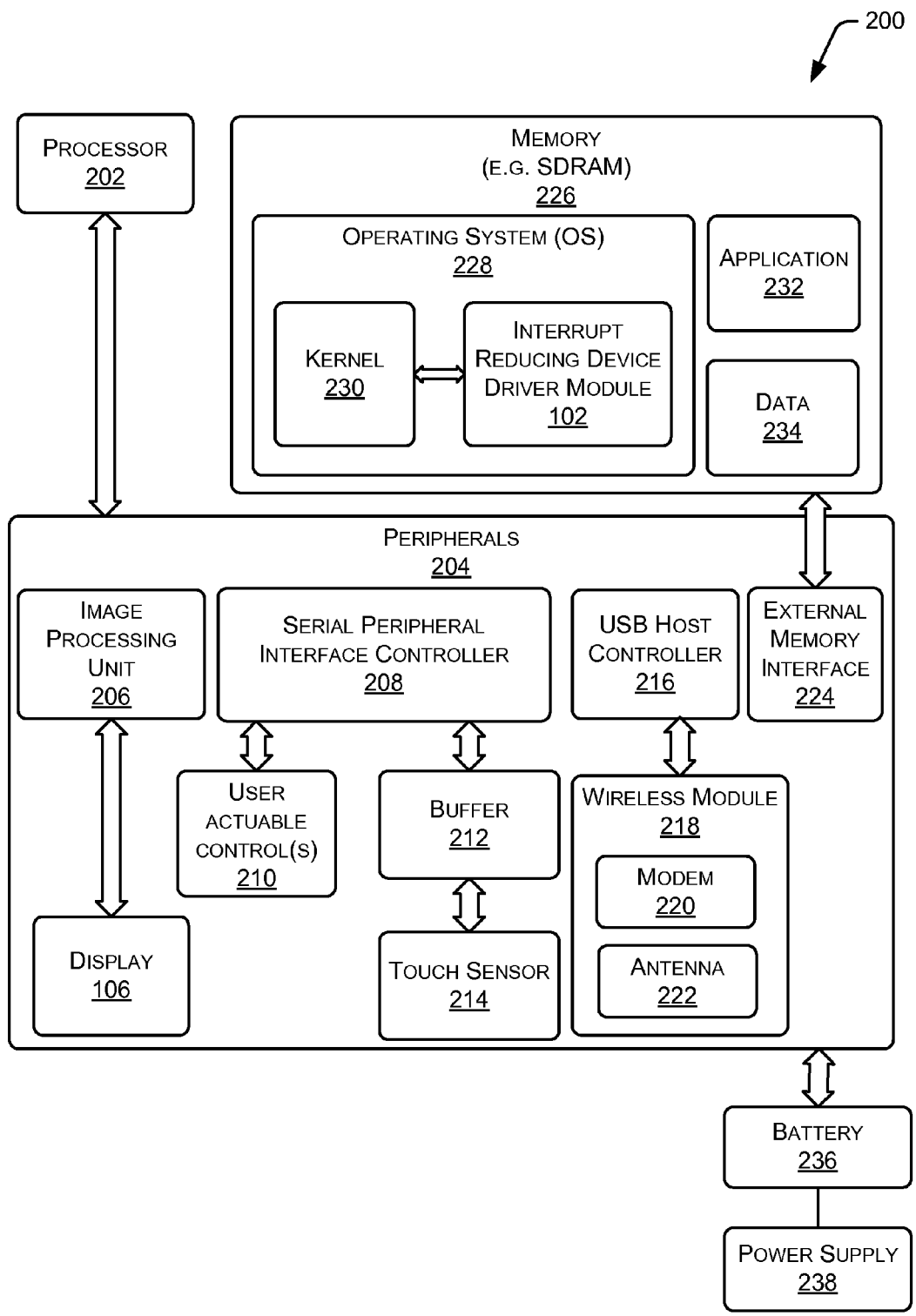
FIG. 2 is a block diagram of an illustrative electronic device showing internal components of the electronic book reader device of FIG. 1.

FIG. 2 is a block diagram 200 of the illustrative electronic device 100 showing the internal components. In a very basic configuration, the device 100 includes or accesses components such as a processor 202 and one or more peripherals 204. Each processor 202 may itself comprise one or more processors.

The peripherals 204 couple to the processor 202. An image processing unit 206 is shown coupled to one or more displays 106. The display 106 presents content in a human-readable format to a user. In some implementations, multiple displays may be present and coupled to the display controller 206. These multiple displays may be located in the same or different enclosures or panels. When multiple displays are present, these displays may be of the same or different types. For example, one display may be an electrophoretic display while another may be interferometric. Furthermore, one or more image processing units 206 may couple to the multiple displays.

For convenience only, the display 106 is shown in a generally rectangular configuration. However, it is understood that the display 106 may be implemented in any shape, and may have any ratio of height to width. Also, for stylistic or design purposes, the display 106 may be curved or otherwise non-linearly shaped. Furthermore the display 106 may be flexible and configured to fold or roll.

FIG. 2 further illustrates that the electronic device 100 includes a serial peripheral interface ("SPI") controller 208 and associated SPI bus. The SPI bus allows for synchronous serial data exchange. SPI is also known as a "four-wire" serial bus due to the number of conductors used. In some implementations, the SPI controller 208 may also be considered the SPI bus master.

Various peripherals may couple to the device via SPI or other interfaces. For example, one or more user actuable controls 210 may couple to the device via the SPI controller 208. These user actuable controls 210 may have dedicated or assigned operations, and may include the buttons 108, the keyboard 110, a joystick, navigational keys, a power on/off button, selection keys, and so on.

A buffer 212 is configured to accept and store data from a peripheral until the processor 202 is able to process the data. The buffer 212 may be implemented as a first-in-first-out (FIFO) buffer, and may couple to the device via the SPI controller 208.

A touch sensor 214, or touch pad, may also couple directly to the device via the SPI controller 208 or via the buffer 212 (as shown). In other implementations, other interfaces such as universal serial bus (USB), inter-integrated circuit ("I²C"), universal asynchronous receiver/transmitter ("UART"), and so forth may be used.

The touch sensor 214 is configured to generate data from touches, such as touches from a user finger, stylus, and so forth. This data is transferred to the buffer 212, which in some implementations is integrated with the touch sensor 214. When the buffer 212 has been filled to a pre-determined threshold by data from the touch sensor 214, an interrupt is sent to the processor 202.

In some implementations direct memory access (DMA) may be used to transfer data. DMA allows peripherals to read and write data to system memory without intervention of the processor 202. DMA-capable touch sensors 214 place data directly into memory via a DMA transfer. After completion of the DMA transfer, a completion interrupt is sent to the processor 202 indicating the data is now available in the memory 226.

The touch sensor 214 may be disposed in various positions within the device. In one implementation, the touch sensor 214 may be placed behind the display 106, such that user input through contact or gesturing relative to the display 106 may be received. In other implementations, one or more of the touch sensors 214 may be placed in front of the display 106, behind the display 106, on the sides and/or back of the device, in an external input device, and so forth.

Each of the peripherals 204 such as the touch sensor 214 incorporate a register set and associated interrupt registers. The interrupt registers may include an interrupt status and acknowledgement, an interrupt control, and an interrupt mask. The interrupt status and acknowledgement indicates what type of interrupt has fired. For example, the interrupt status and acknowledgement may indicate whether the interrupt is a DMA completion interrupt or a FIFO buffer full interrupt. A write to this register or another acknowledge register will acknowledge (ack) this specific interrupt.

The interrupt control register controls the interrupt block. The interrupt mask register indicates which interrupts the host needs from the peripheral. In other words, the interrupt mask register indicates which interrupts are active. When an interrupt is masked, the interrupt handler will not respond to that interrupt.

The peripherals 204 may include a USB host controller 216. The USB host controller 216 manages communications between components attached to a universal serial bus ("USB") and the processor 202 and other peripherals.

The USB host controller 216 may also couple to a wireless module 218 via the universal serial bus. The wireless module 218 may allow for connection to wireless local or wireless wide area networks ("WWAN"). The wireless module 218 may include a modem 220 configured to send and receive data wirelessly and one or more antennas 222 suitable for propagating a wireless signal. In other implementations, a wired network interface may be provided.

The electronic device 100 may also include an external memory interface ("EMI") 224 coupled to external memory 226. The EMI 224 manages access to data stored in the external memory 226. The external memory 226 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 226 may store an operating system 228 comprising a kernel 230 operatively coupled to the interrupt reducing device driver module 102. The interrupt reducing device driver module 102 also operatively couples to the peripherals 204. The external memory 226 may also store executable applications 232 as well as data 234, which may comprise content objects for consumption on the electronic device 100, databases, user settings, configuration files, device status, and so forth.

The electronic device 100 may include one or more other, non-illustrated peripherals, such as a hard drive using magnetic, optical, or solid state storage to store information, a firewire bus, a Bluetooth™ wireless network interface, camera, global positioning system, PC Card component, and so forth.

One or more batteries 236 may provide operational electrical power to components of the electronic device 100 for operation when the device is disconnected from a power supply 238. Operational electrical power is sufficient to provide for operation of the device, as distinguished from the lesser electrical power requirements of a sleep or state retention mode. Power supply 238 may be internal or external to the electronic device 100. Power supply 238 is configured to provide operational power for electronic device 100, charge battery 236, or both. "Battery" as used in this application includes components capable of acting as a power source to an electronic device. Power sources include chemical storage cells such as lithium polymer batteries, charge storage devices such as ultracapacitors, fuel cells, and so forth.

Couplings, such as that between touch sensor 214 and the SPI controller 208, are shown for emphasis. There are couplings between many of the components illustrated in FIG. 2, but graphical arrows are omitted for clarity of illustration.

Interrupt Reduction Process

Figure 3:
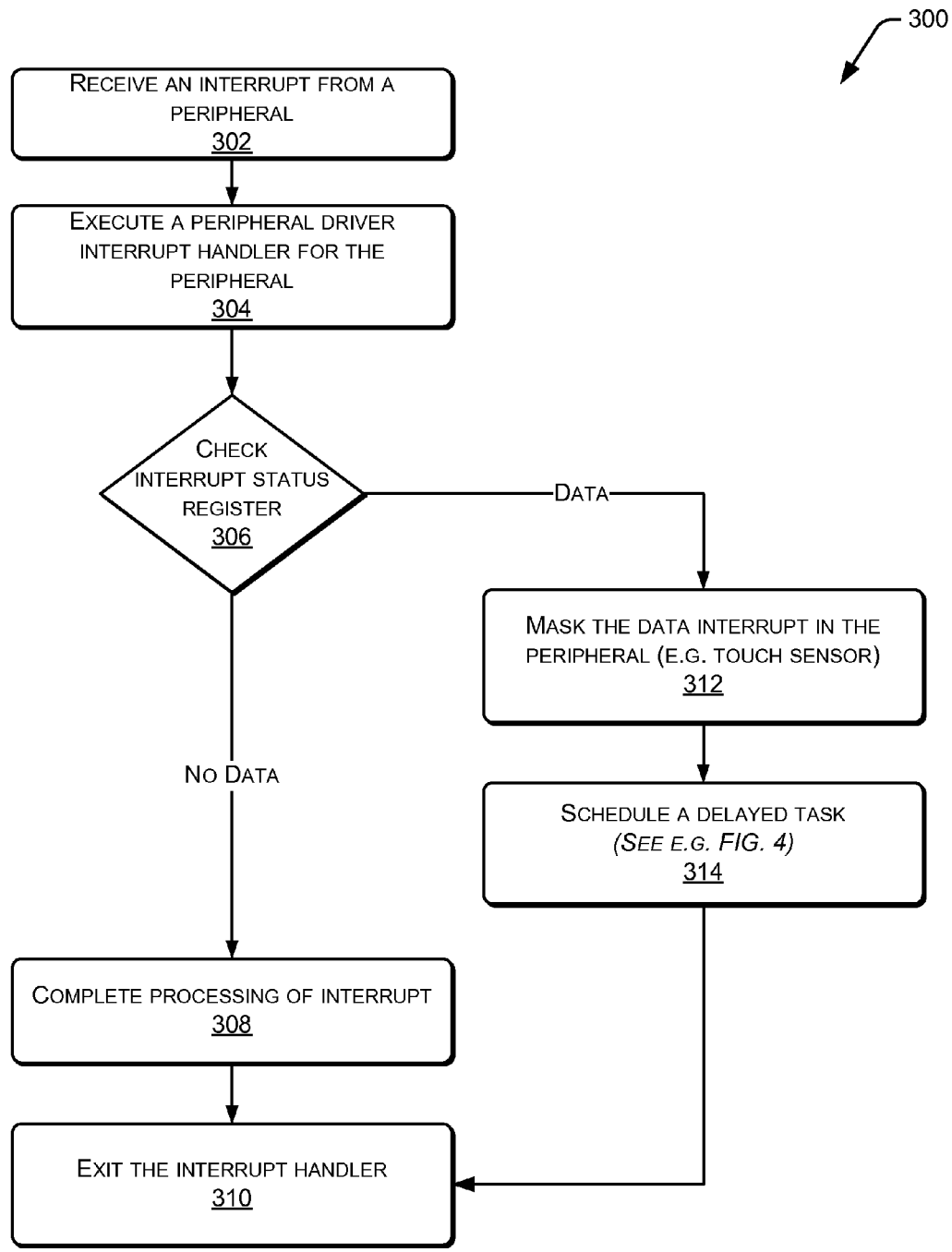
FIG. 3 is an illustrative process of reducing a number of interrupts processed by an electronic device.

FIG. 3 shows an illustrative process 300 of reducing the number of interrupts processed by an electronic device. The process 300 (as well as the processes described below with respect to FIG. 4 and FIG. 5) is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 300 (as well as processes 400 and 500) is described with reference to the architectures of FIGS. 1-2.

At 302, the processor receives an interrupt from a peripheral, such as the touch sensor 214. Different types of interrupts may be received, including data interrupts and non-data interrupts.

At 304, the processor 202 responds to the interrupt by executing an interrupt handler for the peripheral. The interrupt handler then determines, at 306, whether data is associated with the interrupt. For example, in some implementations this may comprise checking an interrupt status register.

In some implementations, the interrupt handler may be called by an alternative interrupt, such as the Fast Interrupt Request (FIQ) exception available on at least some ARM®-based processors using technology licensed from ARM Holdings of Cambridge, England, United Kingdom. A FIQ is a higher priority interrupt than a standard IRQ. When a FIQ is detected, the ARM® processor will automatically disable further FIQs and IRQs. The FIQs introduce less context switching overhead compared to the standard IRQ. For example, a traditional IRQ calls for saving registers, stack information, and so forth. In contrast, FIQs store stack pointer and program counter. Because of the lower overhead of FIQs, they execute quickly and thus are suitable for use the situation described herein.

When no data is associated with the interrupt, at 308 the interrupt handler completes processing of the interrupt and, at 310, the interrupt handler exits. The processor 202 then returns to the task in execution before the interruption.

Returning to 306, when the interrupt handler determines that data is associated with the interrupt, the process proceeds to 312. At 312, the interrupt handler masks or disables data interrupts from the peripheral. The masking thus prevents additional data interrupts from interrupting the processor 202. Thus, the interrupt reducing device driver module 102 prevents the touch sensor 214 and associated buffer 212 from interrupting the processor 202 with repeated notifications that data is present while user input is ongoing.

At 314, a delayed task is scheduled and executed. The delayed task 314 reads the buffer while data resides therein, and when the buffer is empty unmasks the data interrupts in the peripheral. The delayed task is described in more detail below with regards to FIG. 4. The delayed tasks may be implemented as a workqueue or tasklet in the context of a Linux®-based operating system, or a related construct in other operating systems. The delayed tasks can be preemptable and interruptible. Once the delayed task completes, the process may continue to 310 and exit the interrupt handler.

By masking the data interrupts and using the delayed task to process data within the buffer, other critical interrupts continue to occur and the system continues to be responsive. The critical interrupts may include timer interrupts. When the interrupt handler performs all of the processing of data within the buffer, other critical interrupts will continue to stay masked.

Figure 4:
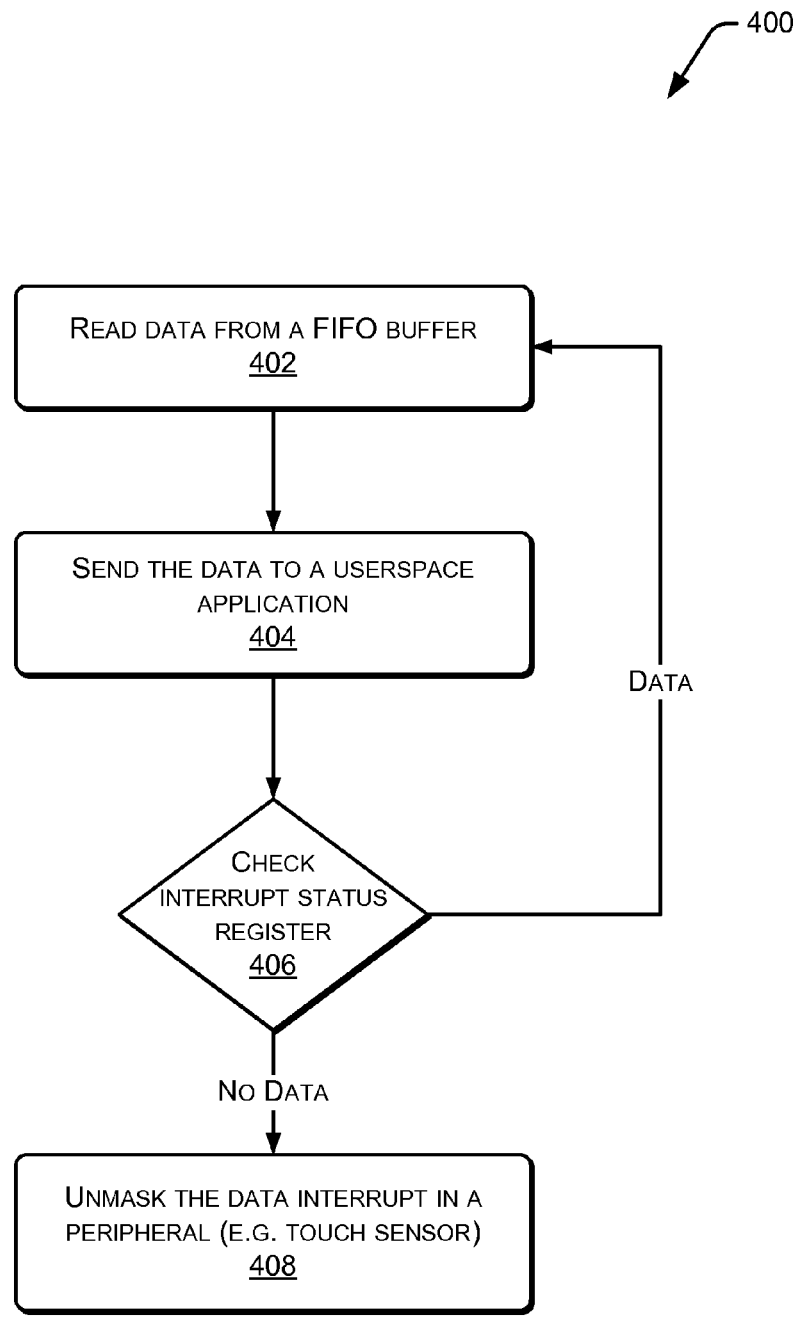
FIG. 4 is an illustrative process of scheduling a delayed task used by the process of FIG. 3.

FIG. 4 is an illustrative process 400 of a delayed task used in conjunction with the process of FIG. 3. This delayed task takes advantage of a typical usage pattern regarding input from user devices, including the touch sensor 214. Input via these peripherals 204 is typically received over some time. When some data is received, a reasonable assumption is made that more data will be forthcoming. Given that data is likely to be forthcoming, it is unnecessary to continue taking interrupts indicating data is present and, thus, the masking described above with regards to 312 is reasonable. With interrupts masked, the responsibility for processing the data stored within the buffer is now handled by the following delayed task.

At 402, the delayed task reads data from the buffer and, at 404, the task sends the data to a userspace application. For example, the task may read touch input data from the FIFO buffer and send the touch input along to an electronic book display application. This process occurs free from receiving additional interrupts from the peripheral, aside from the initial interrupt received above with regards to 302.

At 406, the delayed task determines if data is still present within the buffer. In one implementation this involves checking the interrupt status register. When data is still present within the buffer, the process returns to 402 and reads the data from the buffer. This may be considered a "do while" loop, in that the data is read from the buffer and sent to the userspace application while data is present within the buffer. This looping avoids the necessity for repeated context switches, further improving performance. The presence of data in the buffer is indicated in some implementations by the interrupt status register.

Returning to 406, when no data is in the buffer, the process proceeds to 408. At 408, the task unmasks the data interrupt in the peripheral. As a result, when the peripheral next has data to transfer, an interrupt is generated and the process of FIGS. 3 and 4 begins again.

Figure 5:
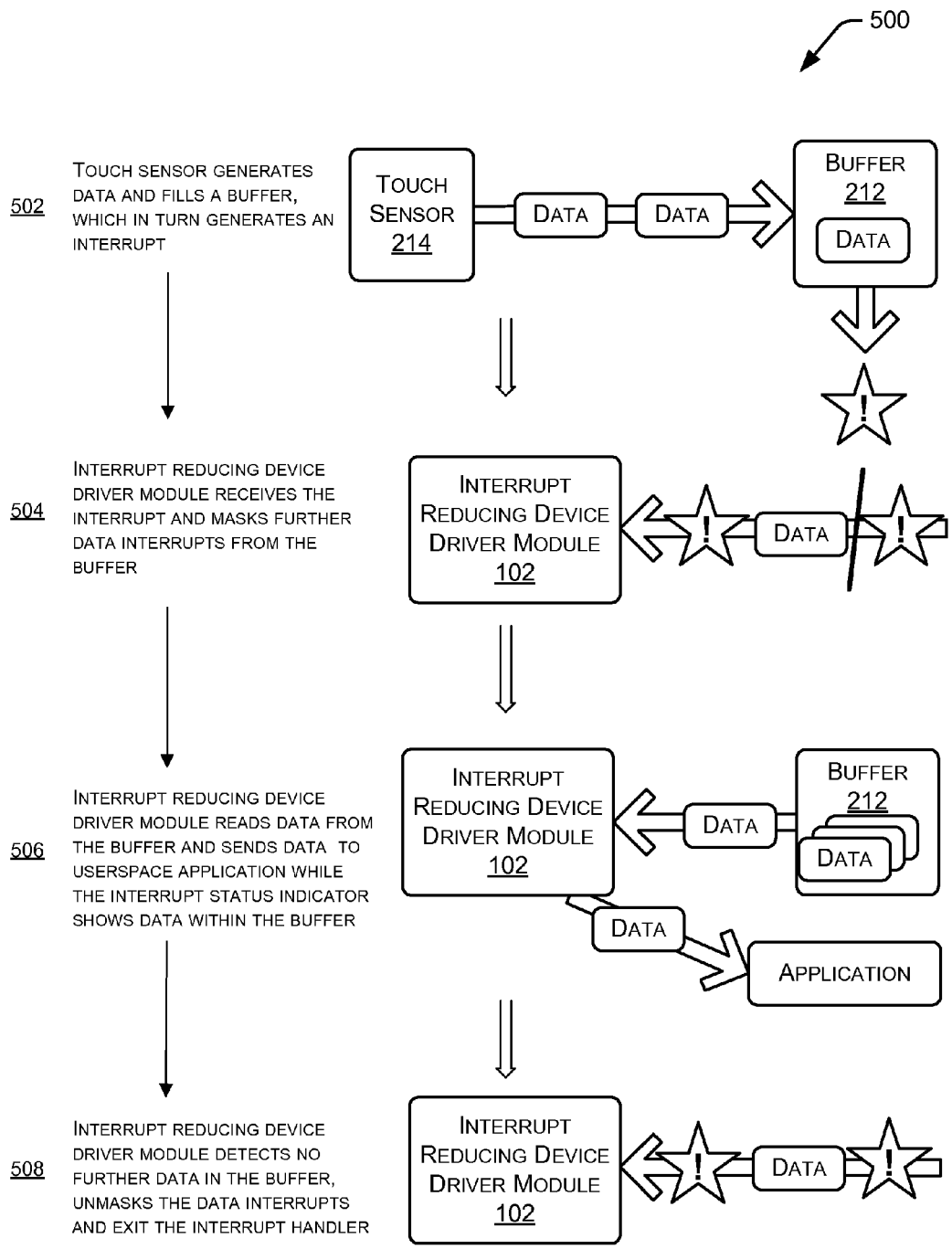
FIG. 5 is an illustrative scenario of reducing interrupts while a user interacts with an electronic device.

FIG. 5 is a simplified illustrative scenario 500 of reducing interrupts while a user interacts with an electronic device. At 502, user input from the touch sensor 214 fills the associated buffer 212. When the buffer 212 has been filled to a predetermined threshold by data from the touch sensor 214, an interrupt (represented here by a star shape with an exclamation point within) is generated and sent to the processor 202. As described above with regards to FIG. 3, this may be a FIQ, IRQ, or other interrupt mechanism. The processor 202 is expected to process this data soon, to avoid loss of data should the buffer 212 be full.

At 504, the interrupt reducing device driver module 102 receives an interrupt and masks further data interrupts from the buffer 212. This masking prevents the processor 202 from handling data interrupts from the touch sensor 214, which may starve other processes of resources. As described above, touch sensors 214 may generate interrupts every 10 ms or more, resulting in the processor 202 continuously switching context to process the interrupts, rather than performing meaningful work.

At 506, the delayed task reads data from the buffer and sends the data to the userspace application. This continues while there is data within the buffer, such as indicated by the interrupt status indicator. By configuring the delayed task to continuously check and read data, the data interrupts which were previously masked are unnecessary. As a result, the processor 202 is not burdened with these interrupt requests.

At 508, no further data remains in the buffer and the delayed task unmasks the data interrupts and then exits. The processor 202 will now see interrupts from the touch sensor. Once the interrupt handler exits, execution of the task that was originally interrupted resumes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. An electronic device comprising:
   a processor;
   a touch sensor coupled to the processor and configured to generate touch data and store the touch data within a buffer;
   memory coupled to the processor; and
   an interrupt reducing device driver module stored within the memory and executable on the processor to:
     receive an interrupt from the touch sensor;
     execute a driver interrupt handler;
     when one or more bits of an interrupt status register are set to indicate that the touch data generated by the touch sensor is stored within the buffer, mask further interrupts from the touch sensor, schedule a delayed task, and exit the driver interrupt handler; and
     upon determining that the one or more bits of the interrupt status register are set to indicate that no touch data generated by the touch sensor is stored within the buffer, complete processing of the interrupt and exit the driver interrupt handler.

2. The electronic device of claim 1, wherein the delayed task comprises instructions to:
   (i) read data from the buffer;
   (ii) send the data to a userspace module;
   (iii) when the one or more bits of the interrupt status register are set to indicate that the touch data generated by the touch sensor is still present within the buffer, return to (i); and
   (iv) when the one or more bits of the interrupt status register are set to indicate that no touch data is present within the buffer, unmask further interrupts from the touch sensor.

3. The electronic device of claim 1, wherein the touch sensor comprises:
   a capacitive touch array;
   a projected capacitance touch array;
   a resistive touch array; or
   an interpolating force sensitive resistor array.

4. The electronic device of claim 1, wherein the buffer comprises a first-in-first-out (FIFO) buffer.

5. The electronic device of claim 1, wherein the electronic device comprises an electronic book reader device.

6. The electronic device of claim 1, wherein the delayed task is preemptable and interruptible.

7. The electronic device of claim 1, wherein the interrupt comprises a fast interrupt request (FIQ).

8. A computer-readable storage media storing instructions that, when executed, instruct a processor to perform acts comprising:
   receiving an interrupt from a peripheral; and
   when one or more bits of an interrupt status register are set of indicate that data from the peripheral is stored within a first in first out (FIFO) buffer associated with the peripheral, masking further interrupts from the peripheral and scheduling a delayed task, the delayed task comprising:
     while the one or more bits of the interrupt status register are set to indicate that the data from the peripheral remains in the buffer, reading data from the buffer; and
     when a threshold amount of data from the peripheral remains in the buffer, unmasking the interrupts from the peripheral.

9. The computer-readable storage media of claim 8, wherein the delayed task further comprises sending the data from the buffer to a userspace application when data remains in the buffer.

10. The computer-readable storage media of claim 8, wherein the delayed task is preemptable and interruptible.

11. The computer-readable storage media of claim 8, wherein the interrupts comprise direct memory access interrupts.

12. The computer-readable storage media of claim 8, further comprising when no data is present within the buffer associated with the peripheral, complete processing of the interrupt and exit an interrupt handler.

13. The computer-readable storage media of claim 8, wherein the peripheral comprises a touch sensor.

14. The computer-readable storage media of claim 8, wherein the interrupt comprises a fast interrupt request (FIQ).

15. The computer-readable storage media of claim 8, wherein the delayed task further comprises sending the data from the buffer to an electronic book reader application when data remains in the buffer.

16. A system comprising:
   a processor;
   memory, coupled to the processor;
   a direct memory access (DMA) bus coupled to the processor, the memory, and a peripheral;
   an interrupt reducing device driver module stored within the memory and executable on the processor to:
     receive a DMA interrupt from the peripheral and via the DMA bus; and
     when one or more bits of a DMA interrupt status register are set to indicate that data from the peripheral is stored within a buffer coupled to the peripheral, mask further interrupts from the peripheral and schedule a delayed task, the delayed task comprising:
       while the one or more bits of the DMA interrupt status register are set to indicate that the data from the peripheral remains in the buffer, reading data from the buffer;
       upon determining that the one or more bits of the DMA interrupt status register are set to indicate that no data from the peripheral remains in the buffer, unmasking the interrupts from the peripheral.

17. The system of claim 16, the interrupt reducing device driver module being further executable on the processor to complete processing of the DMA interrupt when the one or more bits of the DMA interrupt status register are set to indicate that no data is present within the buffer.

18. The system of claim 16, wherein the buffer resides within the memory.

19. The system of claim 16, wherein the peripheral comprises a touch sensor.

20. The system of claim 16, wherein the buffer comprises a first-in-first-out (FIFO) buffer.

21. The system of claim 16, wherein the delayed task comprises a workqueue or tasklet.

* * * * *